Fig. 1

Patented Jan. 23, 1945

2,367,685

UNITED STATES PATENT OFFICE 2,367,685

GRADING MACHINE

Arthur G. B. Metcalf, Milton, Mass., assignor to North American Holding Corporation, Syracuse, N. Y., a corporation of New York Application December 24, 1941, Serial No. 424,296

7 Claims. (Cl. 69—11)

This invention relates to grading machines such as are used to grade shoe soles, taps and other blanks of stock used in the manufacture of shoes, and more particularly to the well-known Nichols type of grading machines illustrated in a series of patents granted to Elmer P. Nichols, Leander A. Cogswell, and James W. Johnston, of which the Johnston Patent No. 2,187,204, dated January 16, 1940, may be referred to as an example. A characteristic feature of such grading machines is that each blank is measured and graded in accordance with the thickness of the thinnest spot of the blank, or of a selected area of the blank, as determined by the detecting and measuring devices.

There are various kinds of grading operations performed by different species of grading mechanisms, and the term "grading," as established in this art, is a generic term and includes evening or skiving the blank as a whole down to the grade or thickness of its thinnest spot, stamping or marking each blank with a character indicating its thickness grade, indicating on a visual indicator the grades of the several blanks, and sorting or distributing the blanks in accordance with their grade measurements. Two or more species of grading mechanisms may be and commonly are contained in one machine and the term "grading" is used herein in its generic sense unless some particular kind of grading is specified. Whatever may be the kind or kinds of grading to be performed the appropriate grading mechanism or mechanisms are adjusted through setting and transmission apparatus in response to and in accordance with the thickness grade of each blank as determined by the detecting and gauging or measuring device, which acts on each blank as successive blanks are passed one by one through the machine. The measurements are usually made in terms of "irons" (⅛₈ of an inch), and the measurement transmitted to the grading devices is usually the thickness measurement in irons or fractions of irons which is nearest to but not greater than the thickness of the thinnest part of the blank as determined by the measuring device. In the machine herein illustrated two types of grading mechanism are shown, namely a visual indicator and an evening or skiving mechanism, but it will be understood that additional or different species of grading mechanisms might be used, such as stamping or marking mechanism or distributors, and all such species are within the scope of the claims.

Grading machines of the aforesaid type usually include measurement transmitting devices which introduce the objectionable features inherent in such devices, such as geometrical translation errors, complicated and therefore costly and delicate provisions for rectifying such errors, and mechanical linkages and transmissions which introduce other errors, exert disturbing reactive forces, necessitate bulkiness, and limit the grading speed.

Systems of this type are improved according to my copending applications Serial No. 389,854, filed April 23, 1941, and Serial Nos. 399,087 and 399,088, both filed June 21, 1941, by separating so far as mechanical force transmission is concerned, the measuring and grading mechanisms and by introducing practically inertialess electrical measuring apparatus.

The principal object of the present invention is further to improve systems of this type by continuously correlating the measuring and grading devices to proportionate settings, this correlation being accomplished electrically to the exclusion of mechanically operated elements wherever they might introduce inertia or uncertainty of operation, or where they might limit the speed of operation otherwise obtainable.

Further objects relate to various features of construction and will be apparent from a consideration of the following description and the accompanying drawings wherein

Fig. 1ᵃ is a diagram similar to Fig. 1 indicating the condition of the machine during resetting;

The machine to be described by way of example of a device according to the invention comprises several apparatus groups, indicated as follows in Fig. 1: The blanks S are supplied to the machine proper by a feeding arrangement F, they then pass through a measuring device M, and are graded by a grading device G; measuring and grading devices are correlated by a transmission apparatus C.

Figure 2:
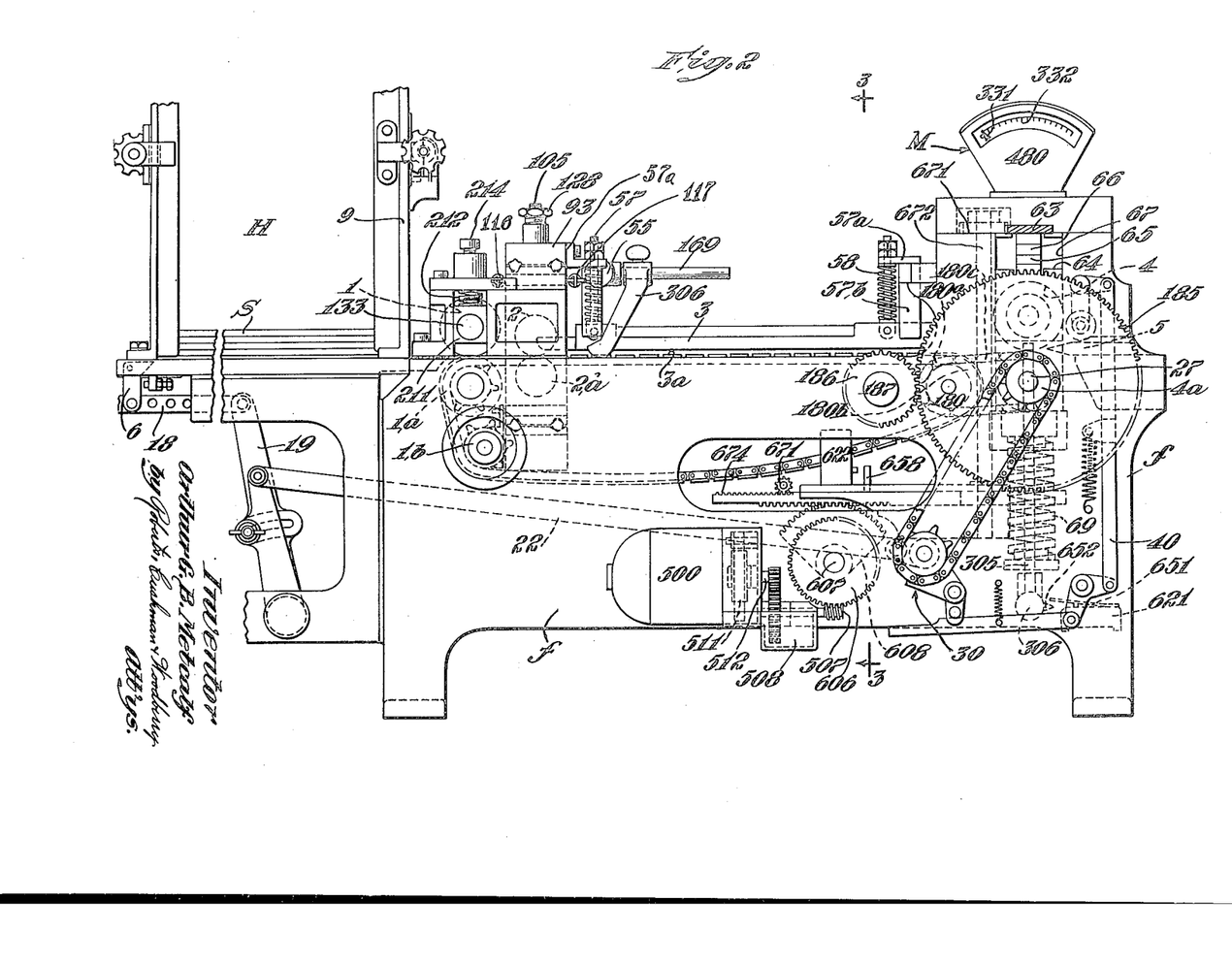
Fig. 2 is a side elevation of the embodiment of a grading machine schematically shown in Fig. 1, as constructed in accordance with the present invention and including a grading device.
Figure 4:
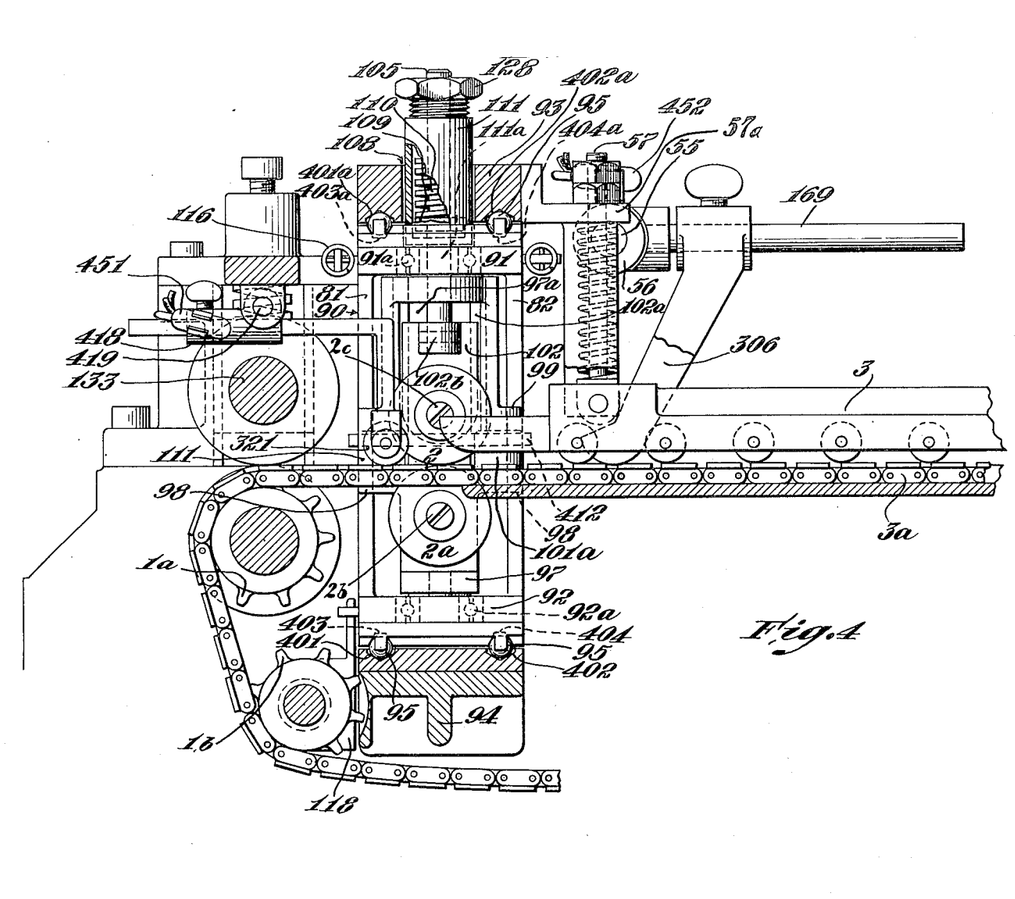
Fig. 4 is a section on line 4—4 of Fig. 3.

*Feeding arrangement and drive.*—The blanks S, as for example shoe soles, are positively delivered to the measuring device M by a pair of continuously driven feed rolls 1, 1a (Figs. 2 and 4). These blanks may be automatically supplied to the feed rolls by appropriate arrangements, as for example from a hopper from the bottom of which they proceed forwardly one at a time. Such a feeding arrangement is, for example, described in the above-mentioned copending application Serial No. 366,853, but not shown in detail herein, since the feeding of the blanks is not an essential feature of the present invention.

The machine herein described may accordingly comprise (Fig. 2) a magazine or hopper H for holding a stack of blanks to be operated upon. This hopper is shown as loaded with a stack of soles or similar blanks S. The soles may be fed one at a time from the bottom of hopper H to a pair of continuously driven feed rolls 1, 1a which positively deliver the soles to the measuring device M.

This feeding device may further include, as fully described in my copending application Serial No. 366,853, filed November 22, 1940, a pawl 6 (actuated by link 46, clutch mechanism 36, link 22, arm 19 and link 18, Fig. 2) which feeds a blank into rolls 1, 1a each time the preceding completed blank is removed therefrom. The feed pawl thereupon returns to its normal, retracted, inoperative position where it remains at rest until the next completed blank is removed from underneath trip arm 7 either by hand or by a pair of ejecting rolls (not herein shown) swinging the trip arm to the right and thereby actuating the clutch mechanism 36 and the linkage connecting it with pawl 6.

The blank then proceeds through the measuring device M with calipering rolls 2 and 2a, which device will be described in detail below. Upon emergence from these rolls, the blank is confined between a presser bar 3 (Figs. 2, 3 and 4) and a continuously driven conveyor chain 3a passing over lower feed roll 1a, an auxiliary sprocket 1b and a sprocket 180a on driven shaft 180. The presser bar is held downwardly by springs 58 on rods 57 linked at one end to the bar whereas the other end is free to pass through bracket 57a fastened to the frame. The presser bar is confined to vertical movement by guide bars 57b (Fig. 2) likewise fastened to frame f.

On its way between feed rolls 1, 1a and the measuring rolls, the blank passes a stop grader feeler 321 which operates a control switch 451 (Figs. 1 and 4) and is adjustably mounted on a sleeve 418 pivoted at 419. After having passed the measuring rolls, the leading edge of the blank encounters a start grader feeler 306 operating a switch 452, and is then by the conveyor delivered to the rolls 4 and 4a of the grading device G. The start grader feeler 306 is adjustably fastened to a rod 169 rocking on shaft 55 (Figs. 2 and 4).

The conveyor chain 3a is driven by a sprocket wheel (not shown) at the rear of the machine, on a transverse shaft 180 (Fig. 2) on which is also fixed a second sprocket wheel 180b connected by a chain 180c with a sprocket wheel fast on shaft 27 (Fig. 2) of the lower skiving roll 4a. Shaft 27 also has fixed to it a large gear wheel 185 (Fig. 2) which is driven by another gear wheel 186 fast on shaft 187. Shaft 187 is the continuously driven main shaft of the machine.

The main shaft 187 has also fixed to it a gear (not shown) driving shaft 192 of the upper skiving roll 4 (Fig. 2). The upper horizontal stretch of the conveyor chain 3a occupies a groove or channel 193 of the bed plate 194 (Fig. 3) which supports the chain. The end of this plate toward the measuring devices has a narrow extension between the two calipering casters, its free end projecting close to the feed rolls 1 and 1a so that the horizontal stretch of chain 3a is supported throughout approximately its entire length, as more fully shown in United States Patent No. 2,187,204.

The shaft 133 of the upper feed roll 1 (Fig. 2) is journaled in boxes 211 sliding in vertical ways provided on the frame of the machine, these boxes being yieldingly urged downwardly by springs 212. The upper ends of these springs bear against adjustable abutment screws 214. The continuously driven shaft of the lower feed roll 1a is journaled in fixed bearings on the frame of the machine and carries gears which mesh with driving gears on shaft 133 of the upper feeding roll.

The above-mentioned switch 452, for example a mercury switch, may be fastened to hub 56 of arm 169 carrying the feeler 306. This arrangement causes feeler 306 to be engaged and raised by a blank passing through the machine, switch 452 being then tipped to close its contacts. This start grader feeler 306 is positioned between the calipering rolls 2, 2a and the presser bar 3, and can be shifted on arm 169, as illustrated in Fig. 4.

The above-mentioned control switch 451 may be a mercury switch fastened to feeler sleeve 418. This switch is open so long as the feeler roll 321 is in lowered position. When the leading end of a sole raises roll 321, the sleeve 418 is rocked thereby closing switch 451. When the trailing end of the sole passes beyond roll 321, the switch will be opened.

It will be noted that, since the positions of roll 321 and of feeler 306 may be varied longitudinally of the path of the blank, the stop-grading means as well as the start-grading means is subject to adjustment so that the measurement of the blank may be confined to any desired part of its entire length, as will appear more clearly hereinbelow.

*Measuring device.*—From feeding rolls 1, 1a the blank passes, as above indicated, between the calipering elements constituting the detecting means of measuring device M.

Figure 3:
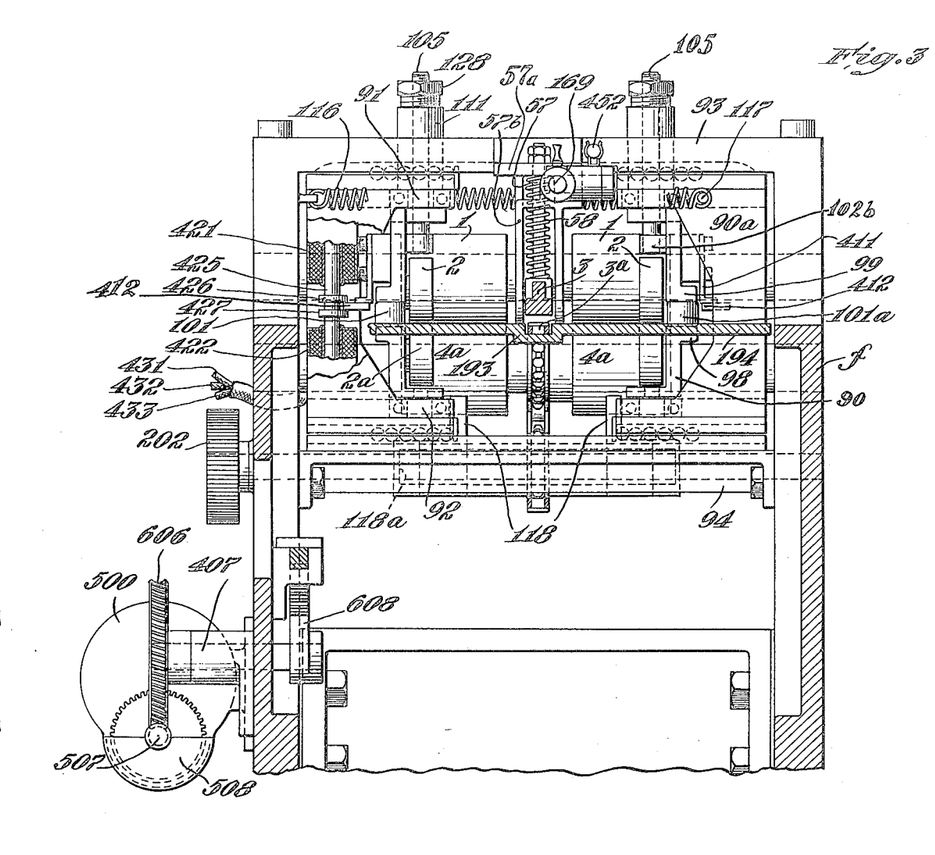
Fig. 3 is a section on line 3—3 of Fig. 2 with the measuring coil device partly in section.

For purposes of the present invention, calipering rolls passing over marginal portions of the blanks directly affect the impedance of the measuring portion of an electric circuit, in the following manner:

The measuring device comprises a pair of yokes 90, 90a with side walls 81, 82 (Figs. 3 and 4) mounted on the machine frame f for transverse travel on two bridges or crosspieces 93, 94. The yokes are normally urged together by tension springs 116, one end of which is fastened to pins 117 on the yokes and the other end to the machine frame. In Fig. 3 the yokes are shown in extended position but normally they are drawn together until they contact stops 118. These stops may be adjusted by means of a screw spindle 118a with right and left-hand threads to which a knurled knob 202 is fastened (Fig. 3). Each bridge has two races 401—402, 401a—402a, respectively, which correspond to yoke races 403—404, 403a—404a (Fig. 4), the yokes running in these races by means of balls 95.

Each yoke has an upper calipering roll 2, a lower calipering roll 2a and two edge rolls 101, 101a, which rolls are mounted on a bracket 97 pivoted in flanges 91 and 92 of yoke 90 by means of ball bearings 91a and 92a.

The edge rolls 101 rotate on pintles screwed into the upper ears 99 of the brackets, through bores in the lower ears 98.

The lower measuring rolls 2a turn on pintles 2b screwed into the bracket and the upper or calipering rolls 2 run on pintles 2c similarly screwed into plates 102 sliding on wires 102a set into round grooves of bracket and slide plate, respectively (Fig. 4). A boss 102b of plate 102 is pinned to a spindle 105 extending upwardly through slot 108 of upper bridge 93. Plate 102 protrudes rearwardly through the window 97a of the bracket and carries an angle 411 to which is screwed a circularly curved actuator piece 412 having its center at the center line of spindle 105.

Rotatably supported within upper yoke flange 91 (Figs. 3 and 4) is the lower restricted portion 111a of a sleeve 111, by means of ball bearing 91a. Spindle 105 fits slidingly into sleeve portion 111a and a bore of upper bracket boss 97a. Spindle 105 has a collar 109, and a spring 110 is retained between this collar and adjustment screw 128 of sleeve 111.

By means of this arraigement, the yokes 90—90a can move laterally, the brackets 57a rotate in bearings 91a and 92a, and calipering roll 2 with actuator 412 moves up and down on spindle 105.

Two coil units 421, 422, 421a, 422a are screwed to the upper and lower flanges 91, 92, respectively, of yokes 90, 90a. The coils have common armatures 425, 425a with two collars 426, 427 engaging actuators 412. Each pair of coils is connected to three terminals 431, 432, 433, as shown in Fig. 1, from which flexible wires lead to the electrical part of the apparatus which may be conveniently housed within the frame carrying the above-described apparatus.

*Grading device.*—As the forward end of the blank, held by presser bar 3 firmly in engagement with the traveling conveyor 3a, approaches the skiving rolls 4 and 4a, it may operate a marking or stamping wheel of known construction, for example of the type described in the above copending application Serial No. 366,853. The machine herein described by way of example has instead an electrically operated indicator 480 (Fig. 2) with hand 331 and scale 332. During the operation of the machine a slide bar 63 (Figs. 1 and 2) controlling the skiving mechanism is adjusted endwise and set in response to and in accordance with the thickness of the thinnest part of the blank as determined by the measuring mechanism, in the manner described below.

The upper skiving roll 4 (Figs. 1 and 2) is suitably mounted in bearing boxes 64 (Fig. 2) to move in vertical ways 67 on the frame f of the machine. Each bearing box 64 is provided upon its top side, as usual in such machines, with a wedge block 65 (Figs. 1 and 2) cooperating with a similar inverted wedge block 66 adjustably secured to the under side of slide bar 63, as described in detail in the above copending application and schematically indicated in Fig. 1. The lower skiving roll 4a is journaled in bearing boxes which are also mounted to slide in vertical ways and are yieldingly supported by a pair of stiff springs, one of which is indicated at 69 in Figs. 1 and 2. To a bearing box 64 of upper skiving roll 4 is fastened a link 305 to which is at 306 hinged a two-armed lever 307 pivoted at 308.

When the forward end of a blank enters between the skiving rolls 4 and 4a, the transverse slide bar 63 having previously been adjusted by the measuring mechanism in accordance with the thickness grade of that blank in the manner to be described below, the upper roll 4 is lifted until its pair of wedge blocks or abutments 65 engage and are stopped by the pair of abutments 66 on slide bar 63. The distance between roll 4 and the edge of the knife blade 5 (Figs. 1 and 2) now corresponds to the thickness of the thinnest spot of the blank as determined by the measuring mechanism and determines the thickness to which the blank will be evened or skived. Thicker areas of the blank will force the lower roll 4a downwardly against the pressure of springs 69 and will be skived off by the knife 5. While a blank is between the two skiving rolls, rod 305 is raised. As soon as the blank leaves the grading mechanism, link 40 is lifted and causes feeding of the next blank.

Figure 1:
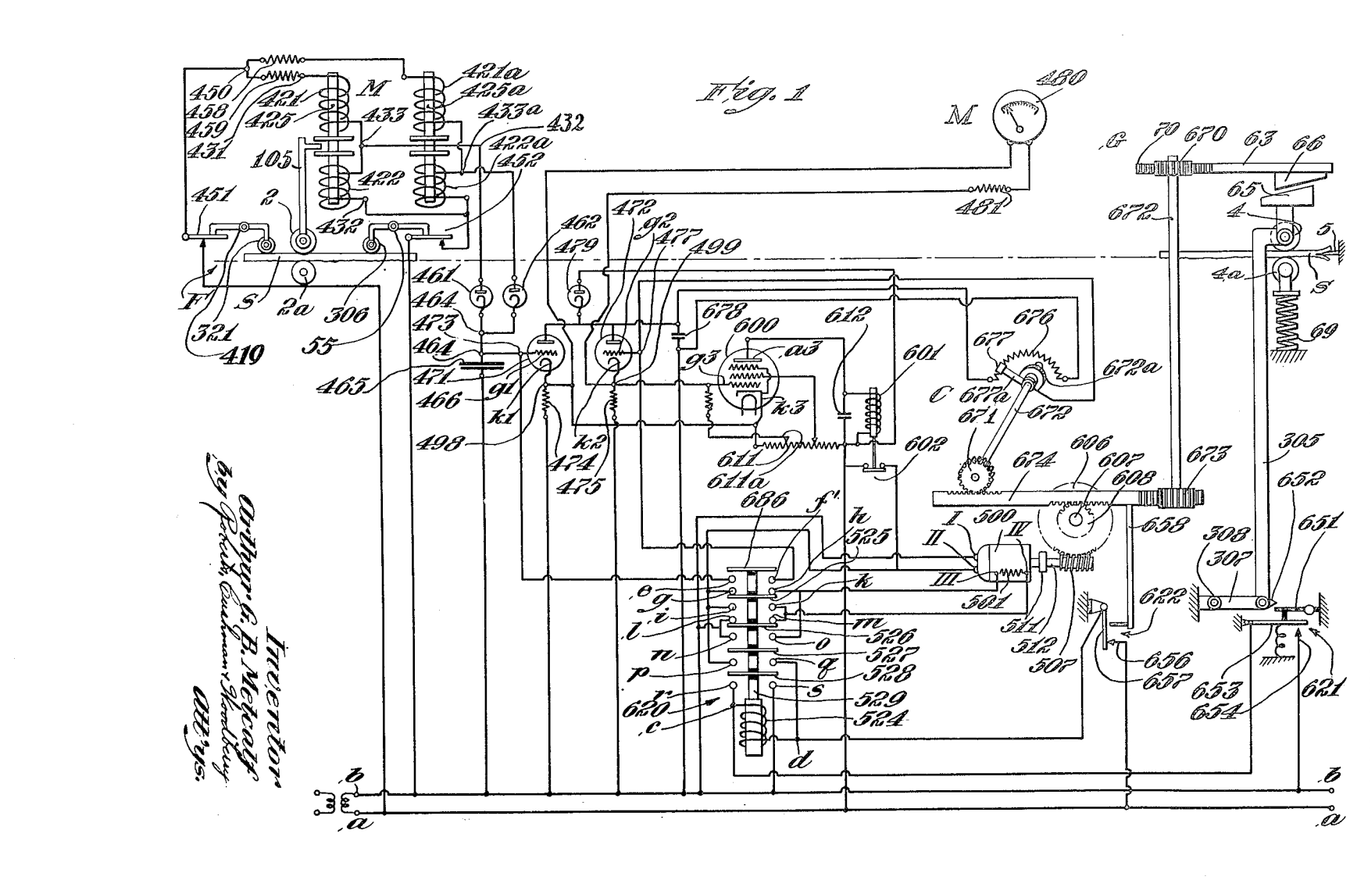
Fig. 1 is a diagrammatical representation of a grading machine described by way of example, including the electrical circuit.

The slide bar 63 has a rack of teeth 70 meshing with a pinion 671 fixed to the upper end of a vertical shaft 672 journaled in bearings on the machine frame (Figs. 1 and 2). At the lower end of shaft 672 is fixed a pinion 673 meshing with a rack bar 674. This rack bar 674 is mounted in ways on the machine frame and has a second toothed portion which meshes with a gear sector 608 on a shaft 607 (Figs. 1, 2 and 3) which also carried a worm wheel 606.

The grading bar 63 is adapted to be driven by an electromotor 500, for example a commutator motor with exciter winding 501, which is geared to shaft 512 by means of worm wheel 606, worm 507 (Figs. 2 and 3) and gear box 508. The motor runs at a high rate of speed, the above-described gear arrangement providing the comparatively low speed at which rod 674 is to be moved. Also, the motor is comparatively powerful with regard to the work it has actually to perform, so that it will practically instantaneously attain full speed upon being connected to its current source. A ccontinuous effective brake 511 is provided on motor shaft 512 in order to stop the motor immediately upon discontinuance of energy supply thereto. Due to these provisions the transient periods at the beginning and end of the running periods of the motor will be negligible and these running periods themselves as short as possible under any given condition.

*Setting and transmission apparatus.*—This apparatus is in the present instance purely electrical and comprises a detecting circuit, a discriminating circuit, a grading circuit, and a restoring circuit.

The detecting circuit herein described is similar to that of my copending application Serial No. 399,088 and includes the above-mentioned coils 421, 422 and 421a and 422a of the two calipering yokes 90, 90a, respectively, with their armatures 425, 425a (Figs. 1 and 3), the normally open stop grader switch 451 which is actuated by roll 321, the normally open start grader switch 452 actuated by start grader feeler 306, and the resistances 458, 459.

Coils 421, 422 and armature 425 of yoke 90, and the corresponding elements of yoke 90a are so arranged that, assuming a constant alternating potential difference to be applied to the terminals 431 and 432, the potential at the intermediate terminal 433 will increase when the armature moves towards the lower terminal 432, following a decrease of blank thickness as measured by calipering roll 2, which through actuator 412 controls armature 425. This purpose may be attained by providing a maximal air space at the lower end of coils 422, 422a for that position of the armature which approximately corresponds to its maximum lift, that is, the maximum blank thickness. Any lowering of the armature, corresponding to decreasing blank thickness, will then increase the inductance of coil 422 and decrease that of coil 421, causing the potential at 433 to raise as compared to that at 432. In other words, lowering of the armature will shift the potential of 433 towards that of 431, and lifting the armature will shift it towards that of 432. Optimum inductance and hence potential changes will be obtained if the magnetic circuit is closed through iron with the exception of a varying gap (corresponding to that portion of coil 422 which Fig. 1 shows as not covered by the armature), which is of the order of the range of the thicknesses to be measured. As shown in Figs. 3 and 4, yoke 90 provides this magnetic circuit.

It will be understood that the herein shown double coil arrangement can be replaced by other electrical elements providing changes of potential level proportionate to movements thereof. For example, a resistance with a slider could be used, or a single coil could be used with an armature normally displaced relatively thereto by an amount providing the above-mentioned optimum gap. This single coil would consist of portions 421 and 422, the wire leading to terminal 433 could be connected at 431 and the controlling potential shift become effective at 431.

As mentioned above, stop grader switch 451 and start grader switch 452 are closed so long as a blank is in contact with the corresponding feeler devices, namely, roll 321 and feeler 306, respectively.

The above elements are connected to a source $a$, $b$ of alternating current in the detecting circuit $a$—451—450—430—431—421—433—432—432—452—$b$. The coils of the second calipering yoke, for the other side of the blank, are connected in a circuit 450—458—421$a$—433$a$—422$a$—432, in parallel to the coils of the first yoke.

It will be understood that only one potential adjusting device may be used, for example, if only one side of a blank is to be measured.

The discriminating circuit for evaluating inductance changes of different sense, in the detecting circuit, includes a condenser 465 and rectifying apparatus, for example, two diodes 461, 462, with their anodes connected to the intermediate coil terminals 433 and 433$a$, respectively, and their cathodes connected to terminal 464 of condenser 465. The other condenser terminal 466 is connected to source terminal $b$.

The grading circuit includes two triodes 471, 472 of similar type, two cathode resistances 474, 475, a potentiometer 676 with adjustable tap 677, a smoothing condenser 678, a diode 479 and a control tube such as pentode 600. Two triodes are used in this circuit in order to insure uniformly correct control tube operation in spite of changes in the tube characteristics due, for example, to warm-up. This purpose can be attained even better if, instead of using two separate triodes, a double triode in a single envelope, of conventional design, is employed.

The anodes of both triodes are connected to source terminal $a$ through rectifier diode 479, and the cathodes to source terminal $b$ through resistors 474 and 475; the grid $g1$ of triode 471 is at 473 connected, preferably through a high resistance (not shown), to plate terminal 464 of condenser 465; the grid $g2$ of the other triode 472 is similarly connected to adjustable tap 677 of potentiometer 676; condenser 678 is in parallel to the potentiometer. The control grid $g3$ of pentode 600 is connected to cathode $k2$ of triode 472 and the cathode $k3$ of the pentode is connected to cathode $k1$ of triode 471. These connections may include a meter 480 with resistor 481 constituting the previously mentioned indicator. A certain bias can be applied to grid $g3$ by means of adjustable potentiometer tap 611$a$.

The anode $a3$ of tube 600 is connected to terminal $a$ through a device responsive to the conductivity of the tube, for example relay magnet 601 bridged in the usual manner by condenser 612. A potentiometer 611 is connected between terminal $a$ and the cathode $k3$ which, as mentioned above, is tied to the cathode $k1$ of triode 471 which again is connected to terminal $b$ through impedance 474.

Relay magnet 601 controls switch 602 in the circuit supplying motor 500 which, with switch 602 closed, is energized through circuit $a$—602—II—I—$b$. The exciter winding 501 is normally energized through circuit $a$—602—II—$g$—$h$—III—IV—$m$—$l$—$b$.

It will be evident that the magnetically controlled switch 602 can be replaced by electronic apparatus, for example, a "Thyratron" whose control electrode is affected by the conductivity of pentode 600.

The above-mentioned adjustable tap 677 on potentiometer 676 is actuated proportionate to the movements of the grading mechanism by means of a gear wheel 670 meshing with a rack portion of rod 674 (Figs. 1 and 2) and sitting on a shaft 672 to which contact arm 677$a$ is fastened. In order to provide adjustment independently of the grading equipment, arm 677 may be manually rotatable relatively to shaft 672, as indicated at 672$a$ of Fig. 1.

The restoring circuit includes a restoring switch 620 which is normally in the position shown in Fig. 1 and includes a solenoid 524 with terminals $c$, $d$, five contact elements 686, 525, 526, 527, 528 fastened to but insulated from armature 529, and seven pairs of contacts $e$, $f'$, $g$, $h$, $i$, $k$, $l$, $m$, $n$, $o$, $p$, $q$, $r$, $s$.

The start restoring switch 621 with insulator block 651$a$ fastened thereto has an actuator 651 cooperating with finger 652 of grader link 35 and two normally open contacts 653, 654. Downward movement of link 305 depresses actuator 651 and momentarily lowers switch element 653 to make contact at 654, whereas further downward and upward movement of 305 have no effect upon switch 621, contact element 653 tending to be in open position.

The stop restoring switch 622 has a fixed contact 656 and a movable contact 657 which are normally closed. An arm 658 fixed to bar 674 opens this switch if the bar reaches a certain point in its movement towards the left of Fig. 1.

The restoring switches are connected as follows: The start restoring switch 621 normally separates contact $r$ and solenoid terminal $c$ of switch 620 from line terminal $b$. The stop restoring switch 622 normally connects contact $q$ of switch 620 and solenoid terminal $d$ to line terminal $a$. Contact $e$ is connected to grid $g1$ of triode 471; contact $f'$ is connected to grid $g2$ of trode 472; contacts $g$, $i$, $p$ of the restoring switch 620 are connected to motor terminal II; contacts $l$ and $n$ are connected to line terminal $b$ and motor terminal I; contacts $h$ and $o$ are connected to exciter terminal III; contacts $k$ and $m$ are connected to exciter terminal IV; contact $q$ is connected to solenoid terminal $d$ and switch 622; contact $r$ is connected to solenoid terminal $c$ and switch 621; and contact $s$ is connected to line terminal $b$.

*Operation.*—A blank S fed by feed pawl 6 (Fig. 2) into the nip of feed rolls 1, 1$a$ will be seized by these rolls and advanced along conveyor chain 3$a$, lifting stop grader roll 321 and closing switch 451.

The blank then arrives between the two pairs of calipering rolls 2, 2a, lifting spindles 105 and armatures 425. The blank next arrives at start grader feeler 306, lifting it and thereby closing switch 452 and completing the detecting circuit.

A potential difference properly apportioned by resistances 458, 459 and the coil impedances is now applied from source a, b to coils 421, 422 and 421a, 422a and an intermediate potential difference, depending upon the position of armatures 425, 425a within their respective coils will exist between line terminal b and coil terminals 433 and 433a, respectively. This last-mentioned potential difference is applied to condenser 465 through diodes 461, 462. Any further lifting of either one of armatures 425, 425a will decrease this potential, but due to the rectifying effect of the diodes the condenser cannot discharge and its condition is not affected. The lowering of either armature, however, will raise the potential at 464 and increase the charge on condenser 465, which charge therefore is at any given time proportionate to the thinnest spot of the blank S so far encountered by either one of the calipering rolls 2 of yokes 90, 90a, respectively.

The triodes 471, 472 are supplied with appropriate anode circuit potential through rectifying diode 479 and resistors 474, 475. The grids $g1$ and $g2$ are, with switch e—686—f' closed, at the same potential, namely, that determined by the position of tap 677 on potentiometer 676. It will be noted that during the grading operation proper, switch 686 is open after having equalized the grid potentials during the resetting period. By moving tap arm hub 672a on its shaft 672, this tap can be adjusted to control the grid potentials, for example by setting indicator 480 to zero. As pointed out above, errors due to tube variations are practically eliminated by using two identical tubes which compensate each other, for example during the warm-up period.

Points 473 and 477 being at the same potential, the tubes will be equally conductive, and with resistors 474 and 475 properly adjusted both cathodes will be at the same potential level. The bias of grid $g3$ of tube 600 is so adjusted by means of setting tap 611a on potentiometer 611, that tube 600 is normally non-conductive, but becomes conductive upon any slight change of the grid potential towards the positive side. If now the potential at condenser terminal 464 and grid $g1$ increases due to the above described unidirectional charging effect during blank measuring, triode 471 will become more conductive, and the potential at 498 become more positive. This renders grid $g3$ more positive and tube 600 sufficiently conductive to energize magnet 601 and to close switch 602.

The potential difference between points 498 and 499 will also affect the instrument 480 proportionate to the potential difference across condenser 465 and hence to the thinnest spot or effective skiving thickness of the blank at that moment under either of the two calipering rolls.

The closing of switch 602 energizes motor 500 through circuit a—602—II—500—I—b. Shaft 607 with gears 606 and 608 immediately begins to rotate in clockwise direction (Fig. 1). Due to this rotation of the gears on shaft 607, bars 674 and 63 will move towards the right and adjust slide bar 63 and hence the grading mechanism.

At the same time, gear wheel 671 rotates tap arm 677 over potentiometer 676; this tends to raise the potential of grid $g2$, until the potential relation of $g1$ and $g2$ is again such that tube 600 becomes nonconductive and motor 500 stops. It will be evident that motor 500 will move rod 674 a distance proportionate to the potential difference between grids $g1$ and $g2$ which is to be compensated and hence to the charge accumulated on condenser 465.

This adjustment corresponds to the measurement of the thinnest part of the blank so far encountered by either of the two calipering devices and tube 600 will become essentially nonconductive to release switch 602 and to stop the motor 500 so soon as bars 63 and 674 have moved an amount proportionate to the maximum downward movement of rolls 2 at any particular time. It will be noted that this arrangement renders the correlation of measuring and grading devices independent of the motor speed, since their positions depend merely upon the position of tap 677 and since the transient periods following and preceding the closing and opening, respectively, of switch 602 are negligible.

The grading mechanism will thus closely follow the movements of the measuring mechanism until the rear edge of the blank passes stop grader roll 321, when switch 451 will open and interrupt the detecting circuit, so that the grading mechanism remains from now on at a position corresponding to the minimum thickness of the measured portion of the blank.

It will be noted that a length adjacent the rear end of the blank, corresponding to the adjustable distance from 2 to 321, will not be graded.

The blank now proceeds between presser bar 3 and conveyor 3a, and next enters between the feeding and skiving rolls 4 and 4a whose abutment wedge blocks 65, 66 were adjusted by the slide bar 63 according to the ascertained grade measurement transmitted through bar 674 with the aid of control switch 602 and motor 500. The minimum blank thickness is indicated on scale 332 by hand 331 and the blank itself skived or evened down by knife blade 5 to a uniform thickness corresponding to the ascertained measurement of its thinnest spot.

When the trailing end of the blank passes beyond the skiving rolls the downward movement of roll 4 causes link 305 to descend, momentarily closing and initiating the following resetting operation.

Switch 621 closes circuit a—622—d—524—c—621—b, energizing solenoid 524. It will be noted that finger 652 of grader link 307 has, in the position shown in Fig. 1a, passed actuator 651 after having momentarily closed switch 621 by depressing the actuator, as above described. The solenoid 524 attracts its armature 529 and changes the connections of the fourteen contacts of restoring switch 620 to establish the following circuits indicated in Fig. 1a. Contacts 528 and s close a holding circuit for solenoid 524 through a—622—524—r—s—b. Contacts g, h and l, m are opened and contacts i, k; n, o; and p, q closed, thereby reversing the exciter winding circuit of motor 500, terminal III now being not connected to line terminal a, but to line terminal b, in the circuit a—622—q—p—i—k—IV—501—III—o—n—b. Contacts e and f' connect grids $g1$ and $g2$, thereby discharging condenser 465 and setting meter 480 back to zero.

Figure 1A:
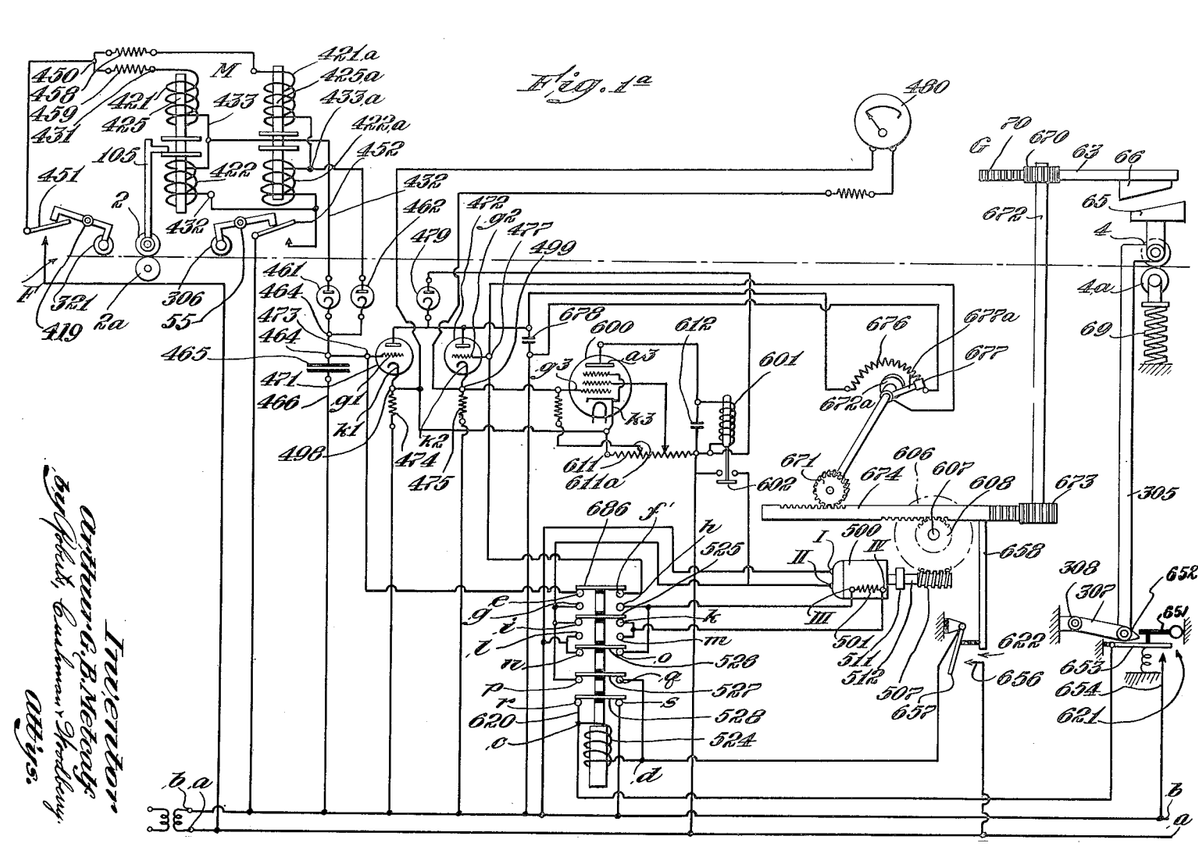

Since switch 602 is by this time open as shown in Fig. 1a, the motor armature circuit becomes established through a—622—q—p—II—500—I—b, which connection is the same as that prevailing during the measurement transmission period. The exciter winding being reversed, the motor will now run backward and return bars 63 and 674 and tap contact 677 into initial position.

As soon as bar 674 has reached its normal position, arm 658 opens switch 622 interrupting the motor circuit as well as the holding circuit for solenoid 524 so that switch 620 returns into normal the waiting and operating position which is that shown Fig. 1. The entire machine including the electric circuit is now reset and ready for another grading cycle.

It should be understood that the present disclosure is for the purpose of illustration only and that this invention includes all modifications and equivalents which fall within the scope of the appended claims.

I claim:

1. A machine for grading blanks comprising detecting means responsive to variations in blank thickness, skiving means, an electric circuit comprising an electric control element, means for varying the potential across said control element proportionate to said blank thickness, and means for setting said skiving means to a skiving thickness proportionate to an extreme value of said potential.

2. A machine for grading blanks comprising detecting means responsive to variations in blank thickness, skiving means, an electric circuit comprising an electric control element, means for unidirectionally varying the potential across said control element proportionate to said blank thickness, means for adjusting the effective skiving thickness of said skiving means under control of said potential variations, and means for rendering said adjusting means ineffective when said effective thickness is proportionate to said potential.

3. An electric grading machine comprising electric detecting means responsive to variations of thickness grades of blanks of stock including means furnishing a current substantially proportionate to said variations, a fixed impedance and means for setting the potential across said impedance proportionate to said variations; grading means adapted to be set in accordance with said variations; a power supply source; and transmission means including motor means adapted to be energized from said source, electron discharge means having a control electrode, means for applying said variations of said potential to said electrode, and means for energizing said motor to set said grading means by adjusting it to amounts proportionate to the output energy of said electron discharge means and hence proportionate to said variations.

4. An electric grading machine comprising detecting means responsive to variations of thickness grades of blanks of stock, a fixed condenser, unidirectionally conducting electric means controlled by said detecting means for changing the potential across said condenser proportionate to unidirectional changes of said grades, grading means adapted to be set in accordance with said thickness grades, a power supply source, transmission means including motor means, means including electrode discharge means having control electron means and means for applying said potential to said control electrode means, and means controlled by the output energy of said electron discharge means for energizing said motor means from said source to set said grading means by adjusting it to amounts proportionate to said grade decreases.

5. An electric grading machine comprising detecting means responsive to variations of thickness grades of blanks of stock; a detector circuit including in series a current source, an inductance with movable core, a condenser and means controlled by said detecting means for moving said core to increase the potential across said condenser proportionate to decreases of said grades; grading means adapted to be adjusted in accordance with said grades; a transmission amplifier including said condenser and furnishing an output potential varying upon increase of said condenser potential; a power supply source; transmission means for setting said grading means including motor means adapted to adjust said grading means, a circuit controlled by said output potential for connecting said motor to said source to adjust said grading means; and means actuated by said motor for rendering said output potential ineffective for controlling said circuit when said grading means is adjusted proportionate to the prevailing grade decrease.

6. An electric grading machine comprising detecting means for varying an electric potential responsive to variations of thickness grades of blanks of stock; circuit means including a condenser, for applying to said condenser a charge increasing proportionate to unidirectional changes of said potential; grading means adapted to be set in accordance with said grade variations; a power supply source; transmission means including normally deenergized motor means for setting said grading means; a transmission circuit including said condenser, for energizing said motor means to move said grading means; and means, actuated by said motor means, for deenergizing said motor when said grader is set proportionate to the prevailing value of said charge.

7. An electric grading machine comprising detecting means responsive to variations of thickness grades of blanks of stock; a detector circuit including a condenser and means controlled by said detecting means for increasing the potential across said condenser proportionate to decreases of said grades; grading means adapted to be adjusted in accordance with said grades; a transmission amplifier including said condenser and furnishing an output potential increasing above a critical value upon an increase of said condenser potential; a power supply source; transmission means for setting said grading means including motor means, a circuit controlled by said output potential for connecting said motor to said source to adjust said grading means when said critical value is exceeded; and potential apportioning means controlled by said motor for bringing said output potential below said critical value and stopping said motor when said grading means is adjusted proportionate to said condenser potential.

ARTHUR G. B. METCALF.